United States Patent
Tarrant et al.

(10) Patent No.: US 10,298,079 B2
(45) Date of Patent: May 21, 2019

(54) MAGNETICALLY LOADED COMPOSITE ROTORS AND TAPES USED IN THE PRODUCTION THEREOF

(75) Inventors: Colin David Tarrant, Oxfordshire (GB); Gordon Day, London (GB)

(73) Assignee: GKN HYBRID POWER LIMITED, Worcestershire (GB)

( * ) Notice: Subject to any disclaimer, the term of this patent is extended or adjusted under 35 U.S.C. 154(b) by 1019 days.

(21) Appl. No.: 14/126,784

(22) PCT Filed: Jun. 14, 2012

(86) PCT No.: PCT/GB2012/051367
§ 371 (c)(1),
(2), (4) Date: Dec. 16, 2013

(87) PCT Pub. No.: WO2012/172355
PCT Pub. Date: Dec. 20, 2012

(65) Prior Publication Data
US 2014/0117803 A1    May 1, 2014

(30) Foreign Application Priority Data
Jun. 16, 2011  (GB) .................................. 1110233.2

(51) Int. Cl.
*H02K 1/27*   (2006.01)
*H02K 1/28*   (2006.01)
(Continued)

(52) U.S. Cl.
CPC ............ *H02K 1/28* (2013.01); *B29B 15/122* (2013.01); *B29C 39/16* (2013.01); *B29C 70/50* (2013.01);
(Continued)

(58) Field of Classification Search
CPC ....... B29B 15/122; B29C 39/16; B29C 70/50; F16F 15/305; H01F 1/083; H01F 41/16;
(Continued)

(56) References Cited

U.S. PATENT DOCUMENTS 2,878,813 A * 3/1959 Neer ...................... B42D 12/00
                                                                      283/66.2
3,051,988 A * 9/1962 Baermann ............. B29C 47/126
                                                                      210/222
(Continued)

FOREIGN PATENT DOCUMENTS

| EP | 0873839 | 10/1998 |
|---|---|---|
| GB | 2297870 | 8/1996 |
| JP | 2001 189535 | 7/2001 |

OTHER PUBLICATIONS

English translation of JPH06220736; Ito et al.; Aug. 9, 1994; Japan.*
(Continued)

*Primary Examiner* — Bernard Rojas
*Assistant Examiner* — Ahmed Elnakib
(74) *Attorney, Agent, or Firm* — Weiss & Moy, P.C.; Jeffrey D. Moy

(57) ABSTRACT

A method of making a magnetically loaded pre-impregnated tape uses a drum 1 that is heated and which is associated with a heated bath 2 containing a thermoplastic resin solution. A fiber tape material 4 is fed onto the drum 1 and, just prior to the fiber tape material meeting the periphery of the drum, the fiber tape material 4 is impregnated with an isotropic magnetic particle material 6 to form a pre-impregnated tape 8. The pre-impregnated tape is fed to a heating station where it is bonded with a thermoplastic resin impregnated fiber tow to produce a magnetically loaded composite tape. The heating station includes a rotatably driven heated mandrel (20) having a magnetic field (41, 42) embedded
(Continued)

therein to provide the pre-impregnated tape (8) with a desired magnetic configuration.

16 Claims, 3 Drawing Sheets

(51) Int. Cl.
| | |
|---|---|
| B29B 15/12 | (2006.01) |
| B29C 39/16 | (2006.01) |
| B29C 70/50 | (2006.01) |
| H02K 15/02 | (2006.01) |
| H02K 15/03 | (2006.01) |
| H02K 15/12 | (2006.01) |
| H01F 1/08 | (2006.01) |
| H01F 41/16 | (2006.01) |
| F16F 15/305 | (2006.01) |
| B29K 105/16 | (2006.01) |
| B29K 21/00 | (2006.01) |
| B29K 71/00 | (2006.01) |
| B29K 77/00 | (2006.01) |
| B29K 79/00 | (2006.01) |
| B29K 307/04 | (2006.01) |
| B29L 7/00 | (2006.01) |
| B29K 105/08 | (2006.01) |
| B82Y 25/00 | (2011.01) |

(52) U.S. Cl.
CPC ............ *F16F 15/305* (2013.01); *H01F 1/083* (2013.01); *H01F 41/16* (2013.01); *H02K 1/27* (2013.01); *H02K 15/02* (2013.01); *H02K 15/03* (2013.01); *H02K 15/12* (2013.01); *B29K 2021/003* (2013.01); *B29K 2071/00* (2013.01); *B29K 2077/10* (2013.01); *B29K 2079/085* (2013.01); *B29K 2105/0872* (2013.01); *B29K 2105/162* (2013.01); *B29K 2307/04* (2013.01); *B29L 2007/007* (2013.01); *B82Y 25/00* (2013.01); *F16F 2222/06* (2013.01); *Y10T 428/31678* (2015.04)

(58) Field of Classification Search
CPC ............ H02K 1/27; H02K 1/28; H02K 15/02; H02K 15/03; H02K 15/12

USPC ................... 310/44, 45, 156.01, 43
See application file for complete search history.

(56) References Cited

U.S. PATENT DOCUMENTS

| | | | | |
|---|---|---|---|---|
| 3,117,065 | A * | 1/1964 | Wootten ................ | G11B 5/845 101/389.1 |
| 3,878,813 | A | 4/1975 | Roberson et al. | |
| 5,075,166 | A * | 12/1991 | Sikorski ................ | B29C 43/32 425/3 |
| 5,477,092 | A * | 12/1995 | Tarrant .................... | H02K 1/22 29/598 |
| 5,546,648 | A * | 8/1996 | Tarrant .................... | H02K 1/22 29/598 |
| 5,650,220 | A * | 7/1997 | Greenwood .......... | B29C 70/504 428/105 |
| 5,843,266 | A * | 12/1998 | Greenwood .......... | B29C 70/504 156/167 |
| 6,362,434 | B1 * | 3/2002 | Yoshida ................ | B29C 70/025 174/256 |
| 7,501,921 | B2 * | 3/2009 | Richards ............... | H01F 7/0215 148/103 |
| 10,014,747 | B2 * | 7/2018 | Tarrant ................ | H02K 1/2726 |
| 2003/0025415 | A1 * | 2/2003 | Hino ..................... | H02K 15/03 310/156.56 |
| 2004/0202848 | A1 * | 10/2004 | Takaya ................ | H01F 17/0013 428/209 |
| 2006/0048881 | A1 * | 3/2006 | Evans ................ | B29C 65/1632 156/64 |
| 2006/0255895 | A1 | 11/2006 | Richards et al. | |
| 2009/0197063 | A1 * | 8/2009 | Uchikiba ................ | B29C 70/62 428/220 |
| 2010/0189916 | A1 * | 7/2010 | Watanabe ............... | B05C 5/002 427/512 |
| 2012/0146440 | A1 * | 6/2012 | D'Antonio ............ | H02K 5/128 310/86 |

OTHER PUBLICATIONS

English translation of JPS58178565; Fuse et al.; Oct. 19, 1983; Japan.*

* cited by examiner

MAGNETICALLY LOADED COMPOSITE ROTORS AND TAPES USED IN THE PRODUCTION THEREOF

This application claims priority to international application No. PCT/GB2012/051367 having a priority date of Jun. 16, 2011 having the same named inventors.

This invention relates to a magnetically loaded composite (MLC) rotor, to tapes used in the production thereof, and to apparatus for manufacturing said rotor and tapes.

MLC rotors, sometimes referred to a flywheels, may be used in electric motors/generators that are rotated at high speed, in excess of 30,000 r.p.m., to act as energy stores and/or motors. The rotors are able to act as a motor or a generator in dependence upon whether energy is applied to, or extracted from, an electrical coil on a stator used in conjunction with the rotor. The use of an MLC rotor has the advantage that discrete magnets, which would fly off at high speed, are not required.

Composite flywheels formed by using tows of fibres, i.e. an untwisted bundle of continuous filaments of man-made fibres, such as glass fibres or carbon fibres, that are embedded in a thermo-setting resin, e.g. epoxy resin, matrix are described in US-A-2002/0083791, EP-A-1199493, U.S. Pat. No. 4,080,845 and WO-A-94/06193.

The known method of producing an MLC rotor is to wind dry glass fibre tows and a slurry made up of powdered magnetic material, such as anisotropic NdFeB, and a thermo-setting resin. The method is to progressively feed the slurry onto a mandrel to produce a layer of the slurry, whilst at the same time wind a layer of dry glass fibre tow onto the slurry layer with an open structure. The openings in the open structure are filled with slurry so that the glass fibre tow traps a layer of MLC slurry, squeezing it to produce the required resin level. The excess resin in the MLC slurry is used to impregnate the glass fibre tow to produce the desired structure. The wound structure is then gelled and cured whilst rotating on the mandrel. Such a method is described in WO-A-94/06193.

The known method of manufacturing the MLC rotor relies on the mobility of the resin and the NdFeB's powder slurry to flow in order to produce the required structure. The ability to flow prevents the adoption of procedures required to enable gains in remanence flux associated with current anisotropic NdFeB particulates to be gained because the particulate tends to clump around the poles of the orientation magnets. Such clumping causes imbalance which is detrimental in a high speed rotor/flywheel and can lead to the destruction of the rotor and stator assembly.

U.S. Pat. No. 5,650,220 discloses a reinforcement bar having a body of reinforced thermoplastic material made by laminating multiple layers of strips of fibre reinforced thermoplastic which may include magnetic material so that the thermoplastic heats more quickly. However, this reference is not concerned with MLC rotors and the problems associated with the manufacture thereof.

The present invention seeks to provide an improved method of making a magnetically loaded composite tape and rotor incorporating the same.

According to this invention there is provided a method of making a magnetically loaded composite tape including the steps of feeding a thermoplastic resin impregnated fibre tow (24) to a heating station (29), feeding an anisotropic magnetically loaded pre-impregnated tape (8) to said heating station, applying heat at said heating station to bond the tow and the tape so as to produce the magnetically loaded composite tape, said heating station (29) including a rotatably driven mandrel (20) which is arranged to be heated, and a compaction roller (28) associated with the mandrel, said tow and tape being fed to pass between the compaction roller and the mandrel, characterised in that the mandrel has a magnetic field (41,42) embedded therein to provide the anisotropic magnetic loaded pre-impregnated tape with a desired magnetic configuration.

Conveniently, the mandrel is configured with an even number of magnets to produce, for example, six pole pairs comprising twelve magnets.

Advantageously, the magnets are arranged in an arc so that as the radius of the tape increases about the mandrel, the poles in the magnetically loaded pre-impregnated tape are substantially aligned.

Advantageously, the tape is wound around the mandrel for subsequent utilisation.

Preferably heat at the heating station is provided by one of laser means and hot nitrogen means.

Conveniently, the laser means is one of pulsed or continuously driven to provide a temperature sufficient to bond the tow and the tape at a temperature, for example, in the range 350° C.-400° C.

Advantageously, the speed at which the tow and the tape are fed is in the range of 0.1-1 m/s.

Preferably, the heated mandrel is arranged to form the composite tape into a desired shape.

Advantageously, the mandrel is heated to a temperature in the range 120°-200° C.

Preferably, the mandrel has a magnetic field embedded therein to provide the anisotropic magnetic loaded pre-impregnated tape with a desired magnetic configuration.

Thermoplastic resin is a polymer that turns to a liquid when heated and freezes to a glassy state when sufficiently cooled. Thermoplastic polymer tapes differ from thermosetting polymers used in MLC rotor construction in the prior art in that they can be re-melted and re-moulded. One of the advantages of using a thermoplastic matrix over the thermosetting matrix of the prior art is that the magnetic particle material's mobility is limited during fabrication so that the clumping effect due to the particles moving and concentrating over the field's poles is substantially reduced.

This is due to the matrix being liquid in a very small location and for a very short time at the heating station during fabrication.

Preferably, the mandrel is substantially cylindrical with alternating pole pairs being arranged adjacent radially inner and outer surfaces of said cylinder.

Advantageously, the mandrel is arranged to be heated by heating means, such as hot air.

Conveniently, the mandrel is arranged to be rotated by a winding machine.

According to a feature of the invention, there is provided a magnetically loaded composite tape made in accordance with the method of this invention.

In a further feature, there is provided a rotor made in accordance with the method of the invention.

The mandrel of this invention is designed to have a magnetic field embedded into it which is the same configuration as that required of the final component. By adopting such an apparatus with anisotropic magnetic particle material, the magnetic regimes of the particles produce a stronger magnetic pattern when the rotor is subsequently magnetised for utilisation.

The invention will now be described, by way of example, with reference to the accompanying drawings, in which.

In the Figures, like reference numerals denote like parts.

Figure 1:
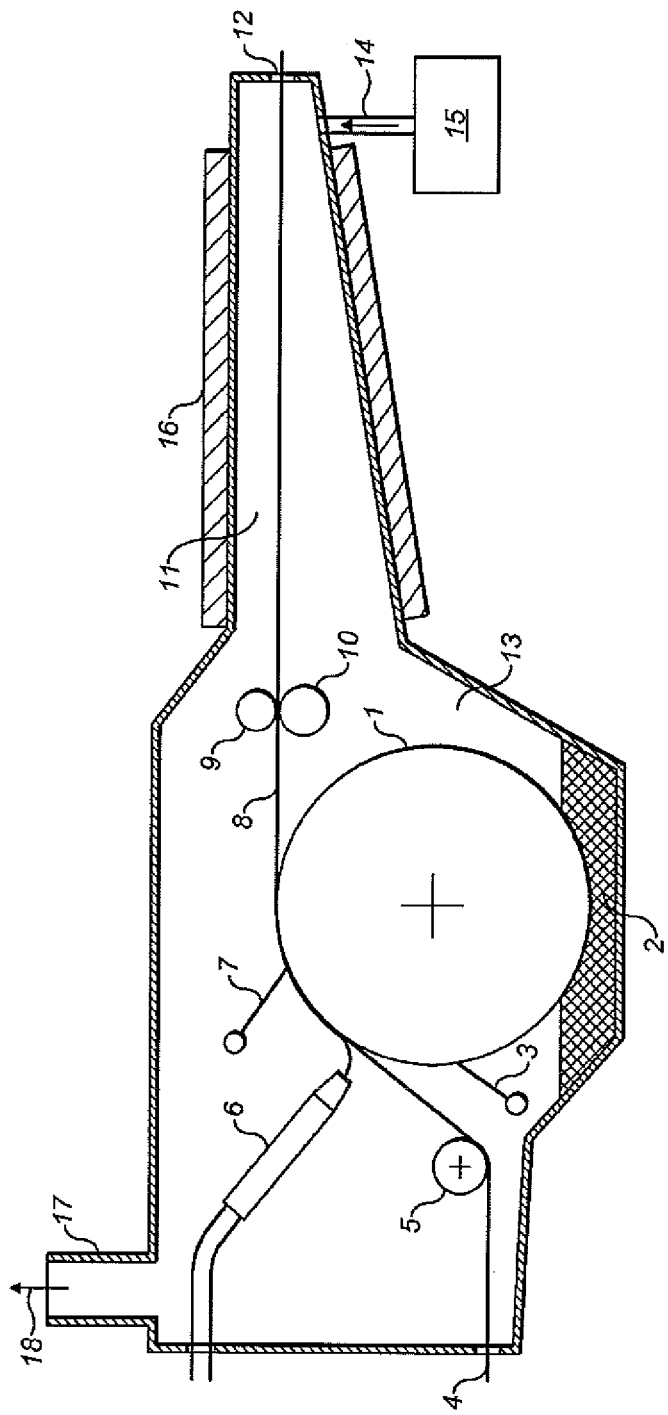
FIG. 1 shows an apparatus for making a magnetically loaded pre-impregnated tape used in this invention.

The apparatus shown in FIG. 1 for manufacturing a magnetically loaded pre-impregnated tape has a drum 1 driven by a motor (not shown), the drum being heated by any suitable source, such as electrical elements or hot air, to a temperature of 60° C. to 100° C. The drum 1 is associated with a bath 2 which is heated to a temperature of 60° C. to 100° C. by any suitable means, such as electrical elements or hot air. The bath is arranged to contain a thermoplastic resin solution, such as epoxy resin, a solvent and polyetheretherketone (PEEK), or polyethermide (PEI) in proportions required to give the desired resin content for the application.

So as to control the thickness of the material in the bath 2 that is transported about the drum 1, there is provided a doctor blade 3, radially arranged adjacent the outer periphery of the drum.

Fibre tape material 4, such as glass fibre, or carbon fibre tape, or Kevlar™ (polyamid), plastics or aluminium tape, boron, nylon, polyolefin, or combinations thereof, or any other suitable known fibres, is fed from a source (not shown) about a feed roller 5 to the drum 1 just prior to a location on the periphery of the drum where a slurry of nano-sized magnetic particles, such as NdFeB particles, solvent and polyetheretherketone (PEEK) or polyetherimide (PEI), is provided from a feed nozzle 6. The slurry may contain 30% to 45% by volume magnetic particle material. Other magnetic materials that may be used are iron, nickel, cobalt, or alloys thereof. The magnetic material may, alternatively, be made of ferrite, e.g. barium ferrite, or other rare-earth elements, such as cobalt-samarium. A slurry doctor plate 7 radially arranged adjacent the drum periphery is used to control the thickness of the combined resin, fibre and magnetic particle slurry, the slurry adhering to the thermoplastic tape on one side and edges. Upon leaving the drum 1, the magnetically loaded pre-impregnated tape 8 that is, thus, formed, is passed between squeeze rollers 9, 10 into a heated tunnel 11 before exiting through an outlet 12 of the tunnel. The tunnel is heated to a temperature of 100° C.-150° C. The tunnel 11 forms part of a housing 13 within which the components 1-10 are located. The housing 13 has an inlet 14 connected to a supply of hot nitrogen 15 at a temperature of 100° C. Heaters 16, located around the tunnel in combination with the hot nitrogen 15, are arranged to drive off excess solvent from the tape 8 and the excess solvent is removed from housing outlet 17, as shown by arrow headed line 18 to be fed to a solvent recovery plant (not shown). The pre-impregnated tape 8 is then passed through a set of heated calendaring rollers (not shown) to produce a flat tape.

Figure 2:
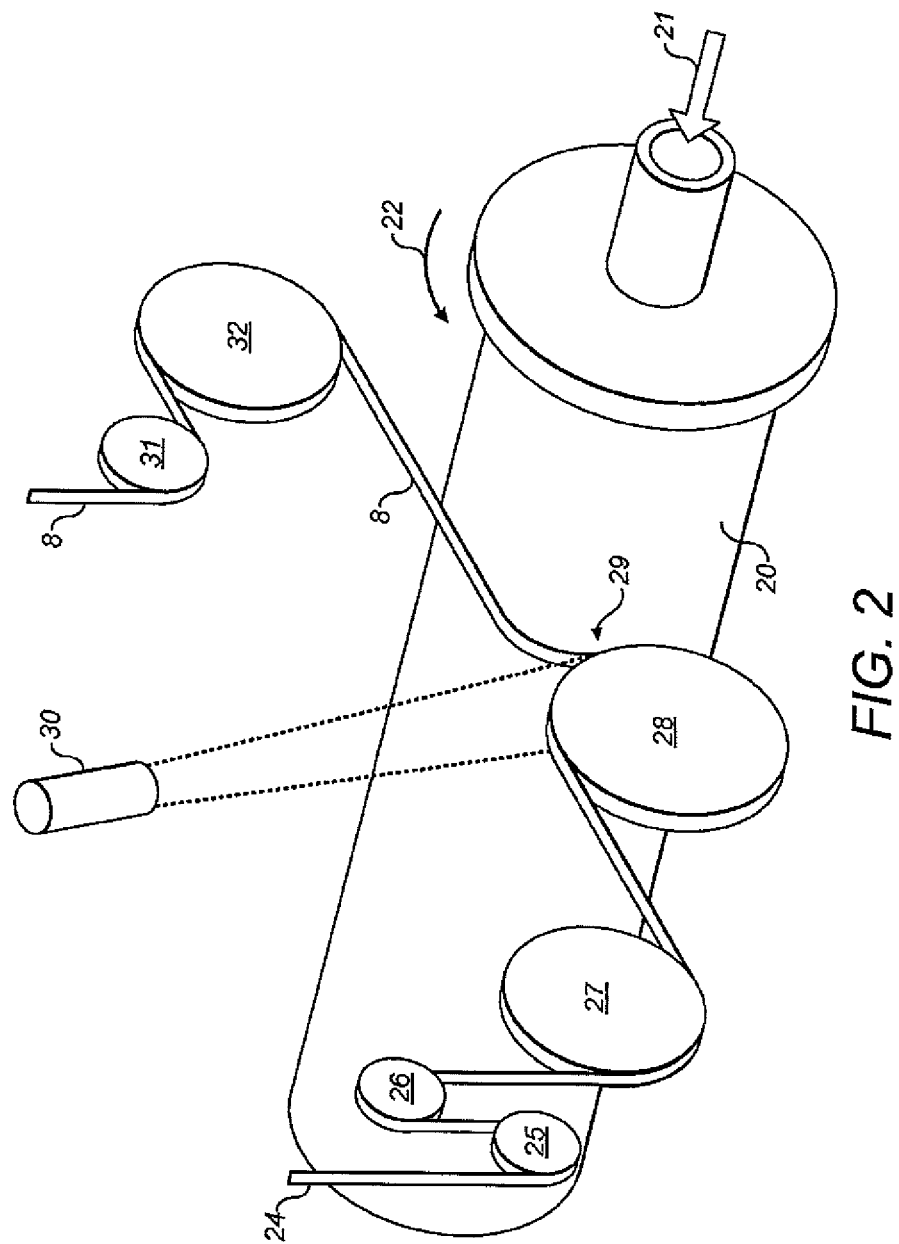
FIG. 2 shows an apparatus for manufacturing a magnetically loaded composite tape in accordance with this invention.

The apparatus shown in FIG. 2 is used to manufacture a magnetically loaded composite tape using thermoplastic tapes. A cylindrical mandrel 20 is driven by a motor (not shown) to provide thermoplastic tapes (described hereinafter) at a speed in the range 0.5-1 m/s and the mandrel is heated by a convenient source (not shown), which may provide the internal portion of the cylinder with hot air, shown by arrow headed line 21. The source (not shown) may be electrically heated. The mandrel 20 is connected to be mounted on a winding machine (not shown), the mandrel being arranged to be rotated in the direction shown by arrow headed line 22. A thermoplastic resin impregnated tow 24 is fed over pre-tensioning rollers 25, 26, 27 to a compaction and guide roller 28 locating at a heating station 29. The heating station 29 is supplied with heating energy from a laser 30 which may be a 2 KW laser providing pulsed or continuous energy at a temperature of 350° C. to 400° C. at the heating station 29. Also supplied to the heating station 29 is the magnetically loaded pre-impregnated tape 8, which is fed over tensioning rollers 31, 32. Although the invention has been described using just one thermoplastic resin impregnated fibre tow 24 and one anisotropic magnetically loaded pre-impregnated tape 8, it is to be understood that the invention is not limited thereto and the number of tapes utilised may be varied in accordance with the construction of MLC composite tape required.

The magnetically loaded composite tape that is formed at the heating station 29 by bonding the tapes 8 and 24 is wound on the mandrel 20 to form a motor/generator rotor. The heating by the laser also assists in releasing stress in the tapes. After formation, stress relief is performed by heating in an oven to 300° C. Although described in the embodiment of FIG. 2 as being formed on a cylindrical mandrel, it is to be understood that the bonded tape output from the heating station may be formed into any desired shape/configuration.

The advantage of using thermoplastic tapes over thermosetting tapes is that the magnetic particle material's mobility is limited during fabrication because the matrix is liquid at the heating station at a very small location and for a very short time. Thus, the clumping effect, due to the magnetic particle material moving and concentrating over electrical field poles, is substantially reduced.

Figure 3:
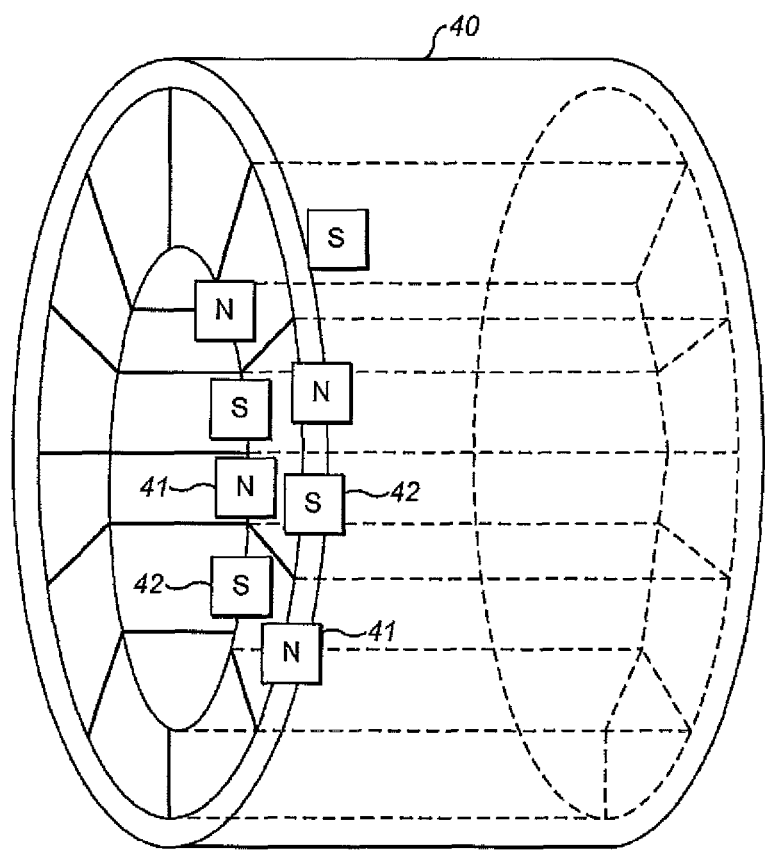
FIG. 3 shows a mandrel used in this invention.

The composite tape preferably has the anisotropic NdFeB particulate material magnetic regimes aligned during the manufacturing process to produce a stronger magnetic pattern when the rotor is magnetised. As shown in FIG. 3, a mandrel 40 of paramagnetic material, such as titanium, which is cylindrically shaped, is provided with equi-spaced electro-magnetic pole pairs 41, 42 arranged circumferentially and radially therein with respect to circumferential surfaces of the cylinder. Thus, alternate north 41 and south 42 poles are arranged radially to the mandrel cylinder, each pole being interspaced by spacers, and the poles alternating around the cylinder periphery. There may be, for example, twelve poles, that is six pole pairs, arranged around the mandrel periphery, although only four pole pairs are shown in FIG. 3 for ease of explanation. Although not shown, the titanium mandrel forms an outer cylinder and a there is a radially inner ferrous cylinder with the pole pairs located in an annulus between the inner and outer cylinders. In use, as the mandrel is turned, the electromagnets 41, 42 are pulsed to align the alternating north and south poles in the tape and the timing is arranged so that the north and south poles alternate with previously magnetised layers. By using a mandrel having a magnetic field embedded within it so as to have the same configuration required by the final component, the magnetic regimes of the anisotropic magnetic particles in the material align to produce a stronger magnet when the rotor is energised and by using a magnetised mandrel, a more even magnetic distribution is achieved. Additionally, the magnetic field in the mandrel assists in holding the tape in position before the laser melts the tape at the heating station 29. The magnets 41, 42 may be arranged in an are so that, as the radius of the tape increases about the mandrel, the poles in the tape are substantially aligned.

The rotor thus formed is then subject to a stress reducing/annealing process in which the rotor is heated to approximately 250° C. and then allowed to cool over a twelve hour period.

Although a stress reducing/annealing process is required when using a thermoplastic tape, there is no gelling or curing operation, as required when using thermosetting resin tapes, so that the manufacturing time is further reduced. With the subject invention, there is no exothermal limit to the size of the rotor produced so that the production of very large diameter rotors is possible, which it is not with current thermosetting, wet, winding processes.

The invention claimed is:

1. A method of making a magnetically loaded composite tape including the steps of applying magnetic particles to a fibre tape material (4) to form an anisotropic magnetically loaded pre-impregnated tape (8), feeding a thermoplastic resin impregnated fibre tow (24) to a heating station (29), feeding said anisotropic magnetically loaded pre-impregnated tape (8) to said heating station, applying heat at said heating station to bond the tow and the tape so as to produce the magnetically loaded composite tape, said heating station (29) including a rotatably driven mandrel (20) which is arranged to be heated, and a compaction roller (28) associated with the mandrel, said tow and tape being fed to pass between the compaction roller and the mandrel, wherein the mandrel has a magnetic field (41,42) embedded therein, said heating station melting and binding said tow and tape and allowing said magnetic field (41,42) to align said magnetic particles with a desired magnetic configuration.

2. A method as claimed in claim 1, wherein the mandrel is configured with an even number of magnets (41,42).

3. A method as claimed in claim 2, wherein the magnets (41,42) are arranged in an arc so that as the radius of the tape increases about the mandrel, the poles in the magnetically loaded pre-impregnated tape are substantially aligned.

4. A method as claimed in claim 2, wherein the mandrel is configured to have six pole pairs comprising twelve magnets.

5. A method as claimed in claim 2, wherein the mandrel is substantially cylindrical with alternating pole pairs (41, 42) being arranged adjacent radially inner and outer surfaces of said cylinder.

6. A method as claimed in claim 1, wherein heat at the heating station is provided by one of laser means (30) and hot nitrogen means.

7. A method as claimed in claim 6, wherein the laser means is one of pulsed or continuously driven to provide a temperature sufficient to bond the tow and the tape at a temperature in the range 350° C.-400° C.

8. A method as claimed in claim 1, wherein the speed at which the tow and the tape are fed is in the range of 0.1-1 m/s.

9. A method as claimed in claim 1, wherein the heated mandrel (20) is arranged to form the composite tape into a desired shape.

10. A method as claimed in claim 1, wherein the mandrel is heated to a temperature in the range 120°-200° C.

11. A method as claimed in claim 1, wherein the mandrel is arranged to be heated by heating means (21).

12. A method as claimed in claim 1, wherein the mandrel is arranged to be rotated by a winding machine.

13. A magnetically loaded composite tape made in accordance with the method of claim 1.

14. A rotor made from a tape in accordance with the method claim 1.

15. A method as claimed in claim 1, wherein said magnetic particles are anistropic NdFeB magnetic particles.

16. A method as claimed in claim 1, forming said anisotropic magnetically loaded pre-impregnated tape (8) by feeding said fibre tape material (4) into contact with a thermoplastic resin, and applying said magnetic particles which are arranged to be nano-sized and to adhere to a surface of said fibre tape material (4) in a continuous process.

* * * * *